Jan. 30, 1968 O. KNEISEL ET AL 3,366,741

TIME MULTIPLEX TELEPHONE SYSTEM

Filed Aug. 17, 1964 2 Sheets-Sheet 2

United States Patent Office 3,366,741
Patented Jan. 30, 1968

3,366,741
TIME MULTIPLEX TELEPHONE SYSTEM
Otto Kneisel, Gauting, and Horst Honold, Munich, Germany, assignors to Siemens Aktiengesellschaft, Munich, Germany, a corporation of Germany
Filed Aug. 17, 1964, Ser. No. 390,026
Claims priority, application Germany, Aug. 20, 1963, S 86,808
6 Claims. (Cl. 179—18)

ABSTRACT OF THE DISCLOSURE

This application concerns a time multiplex telephone system in which the calling and called connection stations are connected together in an assigned pulse phase by actuation of speaking switches connected between the stations and the multiplex path. Actuation of the switches is controlled by switch addresses circulating in storage devices at the assigned pulse phase, but such actuation is completed by pulses circulating in the same phase in control storage devices. Consequently, if a connection is to be retained or held, while one of the stations is to be excluded from the connection, this result can be achieved by cancellation of the pulse of the phase assigned to the connection, in the control storage device associated with the station to be excluded from the connection.

Figure 1:
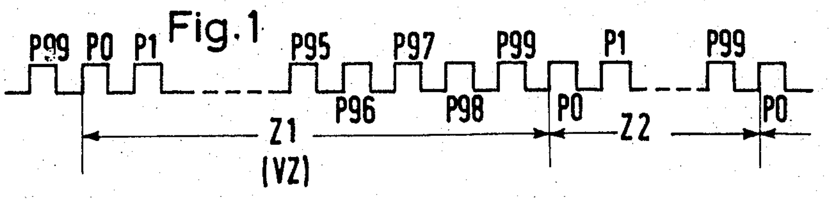

This invention concerns a circuit arrangement for a telephone exchange system, and particularly a secondary exchange system, operating in accordance with the time multiplex principle. In the system of this invention the control of the connections between stations occurs by way of time-spaced pulses assigned to the connection paths, with the calling station connected to the speaking multiplex point or path by way of a corresponding speaking switch or gate, through operation of a first circulation storage device and a corresponding decoder. In similar fashion, the called station participates in the connection by way of its corresponding speaking switch operated by a second circulating storage device and a corresponding decoder. The two connections of the two speaking stations in the connection arrangement are made by way of a pulse phase assigned to the particular connection path.

In a known exchange system operating in accordance with the time multiplex principle, the pulse phases are either individually assigned to the connection stations, or are assigned to the connections themselves. In the latter arrangement, a connection between a calling station and a called station is made by means of a switch activated by the pulse phase assigned to the connection, this switch being operative to connect the station to the multiplex point or path. A speaking switch is assigned to each station participating in a connection in order to provide for the connection of the corresponding station to the multiplex point. The operation of the speaking switch in the pulse phase assigned to the connection path takes place through the functioning of a circulation storage device which is controlled by a decoder. From the circulation storage device for calling stations, for example, a pulse is provided to the corresponding speaking switch with the pulse phase assigned to the connection path. The station being called is to be connected through by way of the decoder to the multiplex point if it is free at that time. In such case an impulse is stored in the assigned pulse phase in a control circulation storage device assigned to the circulation storage device provided for stations to be called, and to the corresponding decoder. This control device operates a switch which connects the circulation store to its decoder, so that the speaking switch of the called station may be operated to connect that station to the multiplex path, periodically, in the assigned phase. A similar control store and switch are connected to the calling circulation store and decoder, for the same purpose.

The object of this invention is to prevent the periodic switching to the speaking multiplex point of a station which is participating in an existing connection, in the event certain switching conditions occur during that connection, for example if a special signal is provided by the other station.

In accordance with the invention the identification of the first or calling station participating in the existing connection is stored in a circulation storage device provided for calling stations. Similarly, the identification of the second or called station participating in the connection is stored in a second circulating storage device provided for called stations. In the event that one of the stations provides a special signal, the coincidence of this special signal with the identification of the calling and the called signals in the respective circulation storage devices, operates in a central control apparatus to cause a command signal to be given to a control storage device. This control storage device is assigned to a circulation storage device wherein an impulse of phase assigned to the connection arrangement is circulating, and in this auxiliary storage device the mentioned pulse is cancelled. The result is that the associated station is prevented from being switched to the multiplex path, as it would normally be by the periodic appearance of this circulating pulse, operating upon the corresponding speaking switch. In this fashion in simple manner it is possible to prevent a station which has been participating in an existing connection, from being switched to the speaking multiplex point at the proper pulse phase, when a special signal is emitted by the other station of the original connection. Thereby, the station which is not to take part in a new connection to be made is prevented from being switched to the multiplex point. Furthermore, unnecessary interruptions of service are avoided by the system of the invention.

A particular purpose for the invention is provided by the desirability of furnishing opportunities for reconfirmation connections, wherein for example an exchange office line which is connected to the speaking multiplex point in an existing connection may be prevented from being connected to that point during the reconfirmation condition.

The evaluation of the control signals and the emission of appropriate command signals are performed by a central control apparatus.

The drawings show an illustrative embodiment of the invention, including the details essential to an understanding of the operation thereof. The embodiment is of a system wherein the signal transmission, including the control as well as the coupling together of the speaking conductors, is carried out through multiplex lines, in accordance with the time multiplex principle. However, the coupling together of the speaking conductors for the production of connections could as well be carried out by a system of contacts arranged to provide the multiplex function in spatial separation, rather than time separation. Further, the central control apparatus of the drawings could also be considerably different.

In the illustrative embodiment of the invention the method of operation of the central control apparatus is also described in as much detail as absolutely necessary for the description of the object of the invention. The control processes performed by this apparatus can be carried out by aligning the addresses or identifications at the output of a signal generator in a way such that the switching processes necessary for reconfirmation occur during time-spaced stages. For instance, the switching processes could be dependent upon the periodic presence at the output of a signal generator of an address corresponding to a previously-assigned pulse phase, with the switching process itself occurring in an operation cycle following a previous information cycle. Each cycle could be of appropriate length (such as 100 milliseconds, if 100 different addresses were to be furnished by the signal generator during the information phase). On the other hand, the central control apparatus could perform the switching processes, such as those necessary for reconfirmation, in stages independent of the signal generator. In such case the changes for such as reconfirmation could immediately follow each other, in dependence only upon the phase cycle appropriate to that process.

Subsidiary objects of the invention are to provide for the reestablishment of the original connection upon emission of a special signal by the reconfirming station, and to provide for switching of the reconfirmed station into connection with the station which was "waiting" during the reconfirmation call. These functions may also be achieved by the use of the original phase or a new phase for the reconfirmation call, as will be explained hereinafter.

Figure 2:
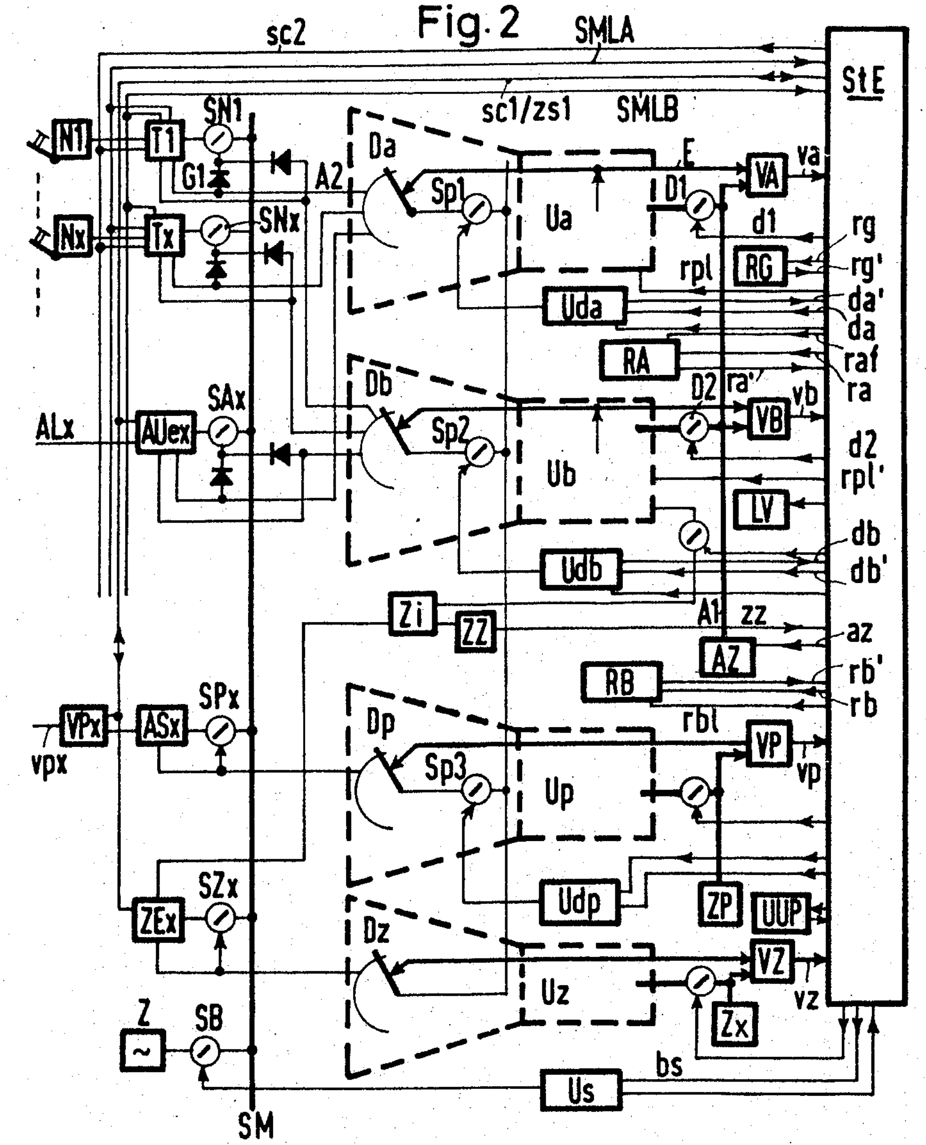
Figure 3:
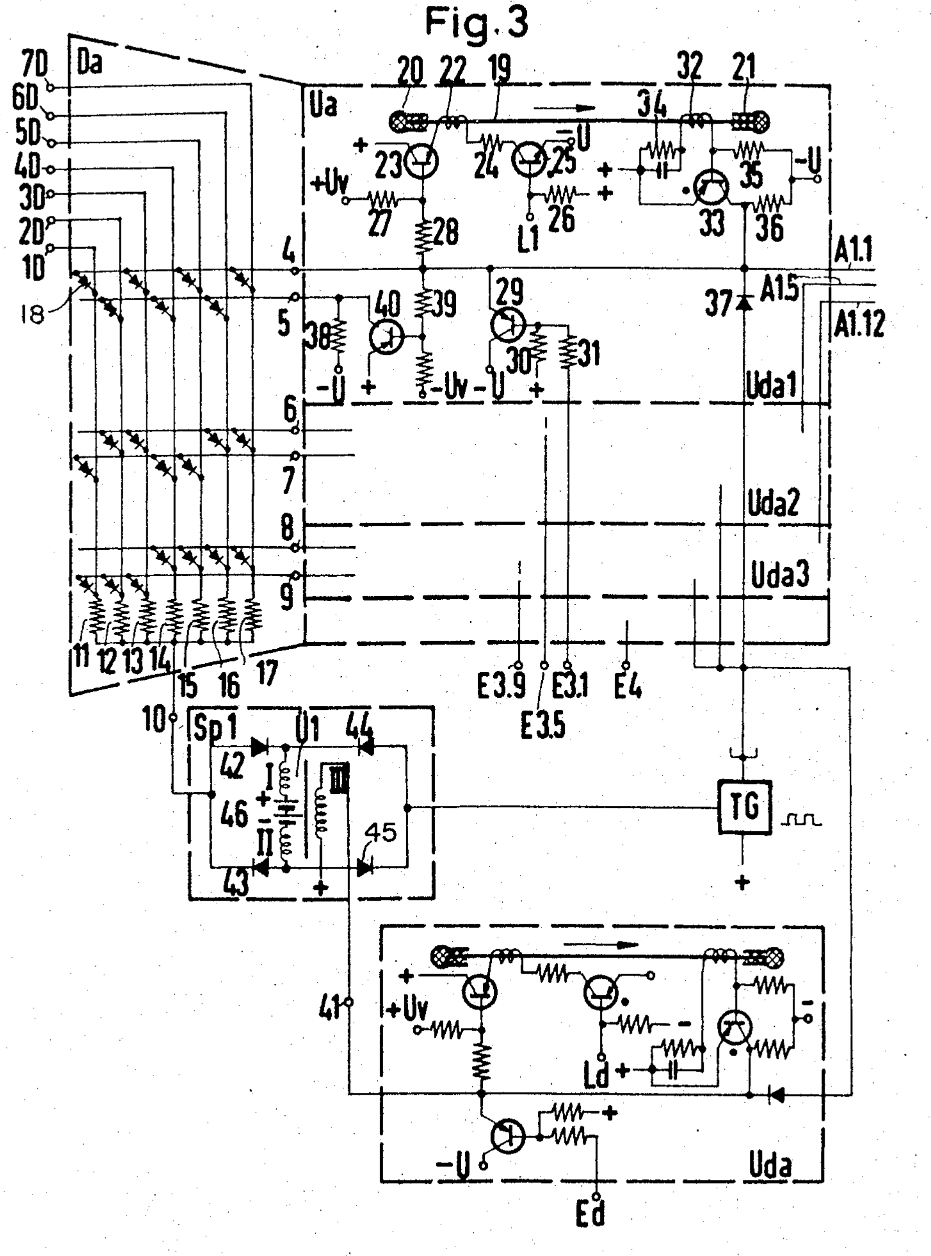

In the drawings,

FIG. 1 schematically shows a time diagram for the cycles and the control pulses in such cycles, provided in a telephone installation, and in particular a secondary telephone installation operating in accordance with the time multiplex principle;

FIG. 2 shows a general view of the telephone installation operating in accordance with the time multiplex principle and the schematic of the present invention; and FIG. 3 shows in detail some of the elements of the apparatus of FIG. 2.

Referring first of FIG. 3, a circulation store or storage device U*a* is shown as a device in which the addresses or identifications of the stations circulate at the assigned pulse phase of the cycle. The decoder D*a* and the circulation storage device U*da* are assigned to the circulation store U*a*. Through operation of switch S*p*1 and decoder D*a* a control pulse is supplied from the circulation storage device U*a* to the speaking switch (for example SN1 of FIG. 2) assigned to the station identified at that time by the storage device.

Circulation storage device U*a* is provided for the addresses or identifications of the call*ing* stations and connections, while circulation store device U*b* is provided for the call*ed* stations or connections. The two storage devices are identical and operate in cyclic fashion in accordance with the assigned pulse phases.

In similar fashion the decoder D*a* assigned to the storage device U*a*, is identical with the decoder D*b* assigned to the storage device U*b*.

In operation of the circulation storage device and decoder, when the station N1 is to be connected to the speaking multiplex path SM a control pulse is provided from the circulation storage device U*a*, through the operation of the decoder D*a*, to the speaking switch SN1 assigned to the station N1. The switch S*p*1 cooperates to provide that the pulse be furnished to the speaking switch SN1, to close that switch and hence connect the station N1 to the multiplex path in the appropriate pulse phase.

As hereinafter described, the term "control signals" will be used to describe signals which are furnished to the central control apparatus S*t*E. The term "command signals," however, will be used to describe signals supplied at the output of the control apparatus. It should also be understood that the signals emitted by the stations, such as for example the reconfirmation and shift signals, are special signals differing from the regular dial signals. Further, the command signals which are provided from the central control apparatus to the various auxiliary storage devices, are also translated there to control signals which are again conveyed to the control apparatus in the next phase cycle. In the following description the terms control signals, command signals, etc. will be designated as signals further identified by the recitals of their respective functions.

As indicated above, the apparatus of the invention preferably operates under the control both of one or more signal generators, which furnish the necessary switching information describing a complete cycle of operation of the control apparatus, and of a pulse generator furnishing the pulse phases during each such cycle. The signal generator AZ may be for example a ring counter which, at every advance in count, provides a different identification, as for example, a connection number, at its output A1. The length of the cycle of the signal generator is determined by the number of different identifications stored in the signal generator. If 1,000 addresses or identifications and 100 pulse phases per identification are employed, with each pulse phase of one microsecond, an identification cycle would last at least 100 milliseconds. In addition, if operation cycles as well as information cycles are provided in the system, the identification cycle is prolonged. On the other hand, if fewer identifications are stored in the signal generator the identification cycle is accordingly shorter. In the system shown in FIG. 2 separate signal generators ZP and ZX are shown for such as calling sets and digit receivers.

With the apparatus of FIG. 2, in an illustrative embodiment of the time sequence thereof, an identification of a station (calling or called) may be provided at the output of a circulation storage device for a period of one microsecond, every 100 microseconds. For this purpose, the identification may circulate in a circulation storage device, such as the device U*a*, in a magnetostrictive wire, in a 100 microsecond cycle. In this system the pulse is available at the output E at the same pulse phase at which it was stored in the storage device. As a result of this, the different identifications switched on within a period of 100 microseconds at output E of the circulation storage device (such as U*a*), can be compared with the identification presented for this particular time period (as in comparison device VA). Thus, it is possible to determine whether the identification at that time presented by the signal generator (such as AZ) is already stored or registered in any circulation storage device (such as UA).

In the time multiplex system described in the operative embodiment, a certain pulse phase, which may be called a "call phase" is assigned to each speaking station seeking to make a connection, upon the removal of the receiver from the hook. During the entire time that the connection is being made, and during the duration of the call with the second speaking station, this same pulse phase remains assigned to the speaking station or connection.

In FIG. 1 the time diagram shows the 100 pulse phases P0 to P99, for each phase cycle. Pulse phases P1 to P94 may be provided as "call phases" and are available to be assigned to the connections during the time the connections are being set up and for their entire duration. The additional pulse phases P95 to P0 are so called "control phases." A pulse phase P1 assigned to a connection thus always reappears in the same position every cycle, for example as in cycles Z1, Z2 etc. That is, each pulse phase recurs every 100 microseconds.

In each case at the time when the pulse phase P1 is present, all the identifications of the speaking stations participating in connections to which this phase is assigned, are collected, identified and, depending upon the switching condition in each case, evaluated in the central conrtol apparatus S*t*E. This of course is presuming that at the same time as the pulse phase P1 arrives, the connection number or identification of one of the speaking stations participating in the connection to which this phase is assigned, is presented at the output of signal generator AZ. If it is found for a connection number switched on at the output of signal generator AZ in a pulse phase (such as P1) that the connection station in question is participating either in establishing a connection or in an already-established connection, then a corresponding identification is stored. If among the identifications stored at the specified time there is found a new identification which was not present during the previous phase cycle, a new evaluation of the identifications present is necessary. This evaluation can occur in an "operation cycle" following an "information cycle," if the evaluation of the identification in each case occurs in dependence upon the conditions and on the connection number switched on at the output of the corresponding signal generator. However, the evaluation can also occur independently of the cycle of the signal generator in the operating cycle, and only in dependence upon the phase cycle.

If the dependence on the signal generator is assumed, then the switching to the next connection number is completed only after an operation cycle follows an information cycle. However, in the case when no operation cycle is required, the signal generator is automatically switched to the next identification or connection number, upon completion of the information cycle of 100 microseconds, so that the next information cycle immediately follows the last. If the control is developed in a way that the connected switching processes occur in successive operation cycles, then the cycle of the signal generator is of no significance and the phase cycle is the only factor determining the emission of commands. That is, these commands occur in dependence upon the operation of the phase generator and, by reason of the emitted commands, the receipt of new identifications, and the content of these identifications, the control processes are developed, and the new commands are emitted automatically.

Turning now to FIG. 2, the functional connections for a telephone installation operating in accordance with the time multiplex principle, will be explained. The telephone installation of FIG. 2 shows a secondary telephone installation having speaking stations N1 to N*x*, together with exchange office lines AL*x*. Speaking stations N1 to N*x* can be connected with the speaking multiplex path or connection line SM by way of switches SN1 to SN*x*, while the exchange office transmission devices, for example AU*ex*, can be connected to the same path by way of switch SA*x*. These speaking switches SN1 to SN*x* and SA*x* are controlled by pulses supplied with the aid of circulation storage devices U*a* and U*b*.

The apparatus of FIG. 2 further includes exchange locations such as VP*x* which can be connected with the speaking multiplex point SM through operation of speaking switch SP*x*, controlled by circulation storage device U*p*. In addition, a digit receiver ZE*x* can be connected with the same multiplex point by way of a switch SZ*x*, while a signal transmitter Z, such as a busy signal transmitter, is connectable to the same point through operation of a switch SB.

One or more of a speaking station, an exchange office line, or an exchange location may be connected to the speaking multiplex point SM every 100 microseconds upon appearance of the particular pulse phase assigned to the connection in which such station, line or location is connected. That is, if for example pulse phase P1 has been assigned to such a connection, the stations or lines or locations taking part in such connection will be connected to the multiplex point for one microsecond every 100 microseconds, under the control of the pulse phase P1. The store U*a* normally stores the connection numbers or identifications of call*ing* speaking stations, and "calling" exchange office lines, while the circulation storage device U*b* stores the identifications, in accordance with switching conditions, of called speaking stations, as well as "called" exchange office lines. In similar fashion the identifications of the call sets of the exchange locations are stored in circulation storage device U*p*, while analogous provision for the digit receivers exists in storage device U*z*.

As already mentioned above, identifications of sets, lines etc. connected together in a common connection are assigned the same pulse phase. Each decoder has as many outputs as necessary so that connections may be made to the various speaking stations, exchange office lines, and call sets. (It will be appreciated that for every exchange location there are assigned several call sets.) In addition, of course, connections must be made to the digit receivers and there must be sufficient outputs for this purpose. As an instance, each speaking switch SN1 to SN*x* is connected to an output of decoder D*a* as well as to an output of decoder D*b*, so that each switch may be operated by either one of the decoders. The apparatus may be provided with OR isolating devices or lattices to prevent the decoders from interfering with each other's operation.

If the identification (such as a connection number) of a speaking station, is conveyed to a decoder, such as D*a*, a pulse is emitted at the corresponding output, such as A2. This pulse is assigned to the particular speaking station for the connection which is to be made or which has already been made. This pulse is then utilized for the control of the appropriate speaking switch, such as SN1, assigned to this speaking station, such as N1. If a pulse appears at the output of decoder D*b* assigned to an exchange office transmission device, simultaneously with the appearance at the output of decoder D*a* assigned to the speaking station (N1), the speaking switches assigned to these particular stations are automatically operated simultaneously to connect the stations to the common signal multiplex path or line. This connection is then repeated periodically, that is every 100 microseconds, at the circulation period of the identification of the stations circulating in the storage devices U*a* and U*b*.

Now assuming that a connection is to be made between a calling station N1 and an exchange office line AL*x* of the secondary installation shown, the party of speaking station N1 lifts the receiver from the hook and thus gives an impulse to the control apparatus S*t*E. The signal generator AZ switches on at its exit A1, successively, the various identifications of the speaking stations, including station N1. Thus, for a duration of 100 microseconds, there is available at the exit A1 the identification of the speaking station N1, in each information cycle of the signal generator AZ.

It is then necessary to check the calling condition of the speaking station N1, which is done by the control apparatus in response to information indicating the removal from the hook of the receiver at station N1. This checking operation is performed under the control of the pulse P0 directed from the control apparatus S*t*E. In response to this inquiry a signal is directed to the control apparatus over signal multiplex line SMLA. This signal identifies the calling condition of the calling speaking station N1.

The central control apparatus S*t*E automatically checks to determine whether a free pulse phase is available for the connection which is to be made. (It will be evident the previous assignment of pulse phases may be indicated by an appropriate register in the control apparatus and that pulse phases may be assigned, for instance, sequentially, under the control of appropriate logic circuits connected both to that register and to the pulse generator.) If a pulse phase is free, that phase is assigned to the calling speaking station N1 for the build up of the desired connection and for the duration of the call. After assignment of the free pulse phase, for example P1, the connection number of the calling speaking station is transmitted, by activation of switch D1, from the signal generator to the circulation storage device U*a*. That is, when the assigned pulse phase is available, the identification is transmitted into the storage device U*a* through the now-opened switch or gate D1.

The identification of the calling speaking station thereby registered in the circulation storage device U*a* is conveyed periodically to the decoder D$a$ through the output E. This pulse appearing with pulse phase P1 in the decoder is conveyed to the proper speaking switch SN1 through rectifier G1. The emission of the pulse by decoder D$a$ is only possible, however, if switch S$p$1 is simultaneously operated by way of auxiliary circulation storage device U$da$. In other words, a pulse of phase P1 must both be supplied from the device U$da$ to the switch S$p$1, and be supplied from the storage device U$a$, to the decoder, in order for the speaking switch SN1 to be operated.

After registration of the connection number of the calling speaking station N1 with the pulse phase P1 in circulation storage device U$a$, a free digit receiver ZE$x$ is requested by the central control apparatus S$t$E, in response to the indication of the calling condition of station SN1. The identification of the free digit receiver is then registered in the circulation storage device U$z$, and digit receiver ZE$x$ is then switched to the speaking multiplex path SM by operation of switch S$zx$, during the assigned pulse phase P1. This operation is of course simultaneous with the connection of the calling speaking station N1 to the same multiplex point, and is accomplished in similar manner. As a result, the digit receiver ZE$x$ receives the identification digits transmitted by the calling speaking station to identify the station to be called. These identification digits, sent coded, are converted into binary direct current code signals by means of the digit receiving means Z$i$. They may then be switched, without temporary storage, into the circulation storage device U$b$, with the same phase P1, after checking in an appropriate checking arrangement which is not shown.

After registration of the identification of the desired speaking station in circulation storage device U$b$, an inquiry is made to the central control apparatus S$t$E to determine whether or not the connection number of that desired station is already registered in circulation storage device U$a$ or U$b$. This of course is to make sure that the called station is not already participating in another call. This operation is performed by appropriate comparison arrangements, not shown, but which may be of well known type.

If the desired called station is free, the connection between that station and the calling station N1 can be completed by simultaneous operation of the switch S$p$2, with the switch S$p$1.

A similar switch S$p$3 is located between the output of the circulation storage device U$p$ and the decoder D$p$. Switches S$p$1, S$p$2 and S$p$3, when in rest or open position, prevent the operation of the corresponding decoders by the associated circulation storage devices. Each switch, such as S$p$1, is closed in pulse fashion through the corresponding circulating pulse provided, for instance, by circulation storage device U$da$. This pulse closing permits the identification appearing at the output of the corresponding circulation storage device, such as U$a$, to operate the corresponding decoder D$a$. The switch, for example, S$p$1, is only supplied with pulses for the output of the corresponding identifications when the control apparatus determines by reason of the identifications present with the assigned pulse phase that the speaking station is still free. Further, in this manner, and independently from each other, several identifications can circulate with different circulation phases and be emitted so that such connections can be made simultaneously, the maximum number of connections to be made to be equal to the number of pulse phases provided. The presence of the "through switch," such as S$p$1, makes it possible to save special temporary storage devices which otherwise would have to be provided for the storage of the identification number of such as the called speaking station.

The operation of the switches such as S$p$1, however, is not only dependent on the switching condition of the calling or called connection station, but also on other switching conditions. One such switching condition is the initiation of a reconfirmation connection by a speaking station, signalled by emission of a special signal. In this case at least one of the speaking stations participating in the original connection must not be switched to the signal multiplex path. This is possible with the system of the invention in simple fashion by merely preventing the activation of the corresponding switch, such as S$p$1, at the pulse time of storage of the identification of the excluded or "waiting" station. For this purpose, the pulse circulating in the storage device U$da$ at that pulse time may be cancelled. Then, when the call is to be retraced, a pulse is once again stored in the control store U$da$ to operate the switch S$p$1.

Thus, in the arrangement of the invention, and depending upon the switching condition at the time, either the switch assigned to the circulation storage device for calling speaking stations, the switch assigned to the storage device for called speaking stations, or the switch assigned to the circulation storage device for call sets, can be rendered ineffective depending on the different switching conditions existing. The control of the identified switches occurs in each case in dependence on the pulse circulating in the corresponding auxiliary storage device, for example U$da$. The feed of these pulses into the identified auxiliary storage devices takes place from the control apparatus S$t$E by means of the transmission of registration pulses to the corresponding pulse phases. Each time the pulse fed in appears at the output of control stores, such as U$da$, a pulse is also given to the corresponding switch, such as S$p$1. These pulses control the required closing impulses for the speaking switches.

Thus, in simple manner, it is possible to disconnect from the multiplex point one of the speaking stations participating in the original connection and thereby to prevent the party at that station from hearing the conversation with the other station.

The additional control circulation storage devices, like all other storage devices can for example contain travel time links each formed by a wire of appropriate length through which travel one or more pulses. The pulses arriving at the output of the wire in each case are instantaneously fed to the input of the wire. In this fashion a periodic circulation of an impulse takes place until the time when the pulse is cancelled.

The identification of the speaking station participating in a connection, such as N1, and of an exchange office transmission device, such as AU$ex$, appears simultaneously at the output of the respective decoders D$a$ and D$b$, when the connections are made by way of the corresponding speaking switches to the speaking multiplex point SM. That is, these two stations are connected to the multiplex path pulse-wise every 100 microseconds, in the pulse phase (such as P1) assigned to the connection path.

Changes in the switching condition during a connection are then ascertained when the signal generator has switched on the address or other identification of the station emitting the signal requesting the change, at the output of such as signal generator A$z$. The central control apparatus S$t$E includes appropriate lattice and flip-flop (bistable multivibrator) circuits which are operated by reason of the signals received to furnish commands for the emission of new information, or for the control of different switches.

More specifically, information signals are given to the control apparatus S$t$E under the control of comparing devices VA, VB, VP and VZ, when the corresponding signal generators AZ, AZ, ZP and ZX switch on the identifications of the stations which are simultaneously provided at the outputs of the corresponding circulation storage devices U$a$, U$b$, U$p$ or U$z$. In the case of such time coincidences, appropriate signal pulses are furnished over the conductors $va$, $vb$, $vp$ and $vz$, depending upon which ones of the comparing devices VA, VB, VP and VZ indicate such a coincidence.

Turning now to FIG. 3, the apparatus forming the circulating storage device U*a* will be more fully described as illustrative of each such storage device. Moreover, the apparatus forming the decoder and the through switch, such as D*a* and S*p*1, respectively will be further described, as will be the control circulation storage device U*da*. It will be apparent that the combination specifically shown in FIG. 3 is duplicated for the other corresponding combinations of devices, such as the circulation storage device U*b*, the decoder D*b*, the switch S*p*2, and the control store U*db*.

First of all the method of operation of the circulation storage device U*a* will be described. This device supplies identifications of the calling stations to be conveyed to decoder D*a*, in pulse fashion, every 100 microseconds, the conveyed phase being that assigned to the connection in which the calling station is located. The identification of a calling station in the circulation storage device U*a* is stored in code fashion. For this reason separate transit time links are provided for the various digits of the code. That is, the storage device U*a* is made up of several travel time links such as those identified at U*da*1, U*da*2, and U*da*3, etc. The number of such links will, of course, depend upon that number necessary to furnish the code identification of each calling station, and, if necessary for further identifications.

It will be seen that the travel time link U*da*1 is shown in detail in FIG. 3. That link includes a wire 19 operative to supply a pulse at its output at a predetermined time interval of, for example, 100 microseconds, after the pulse is fed to its input. The wire is fastened at both ends by appropriate suspension devices 20 and 21, preferably in a way such that no reflections of the impulses can occur. Pulses are fed to the magnetostrictive wire 19 through a coil 22. Current flowing through this coil sets up a magnetic field which slightly shortens or lengthens the wire 19 longitudinally, and this longitudinal change travels through the wire, in pulse fashion, longitudinally. (An appropriate magnetostrictive material for the wire is, for example, nickel.) One end of the coil 22 is connected to ground potential (marked positive throughout the figure) through the collector to emitter connection of the PNP transistor 23. The other end of the coil is connected to negative potential —U through resistor 24 and the collector to emitter connection of the NPN transistor 25. The base of the transistor 25 is connected to ground potential through resistor 26, so that this transistor is biased appropriately for conduction and is normally conductive. The base of transistor 23, on the other hand, is connected to positive potential +U*v*, through resistor 27. As a result, transistor 23 is normally biased off and is therefore blocked. However, the base of transistor 23 is also connected to terminal 4 through a resistor 28. If a negative pulse appears at this terminal, transistor 23 becomes temporarily conductive so that a current pulse is passed through coil 22. Since this coil surrounds the wire 19, a pulse is thereby fed to the input of that wire.

The apparatus of FIG. 3 provides for application of a negative pulse through the terminal 4 in two different manners. In the first alternative, PNP transistor 29 can furnish such a pulse. This transistor has its emitter connected to the terminal 4, with its collector at potential —U and its base connected to ground through resistor 30. The transistor is therefore biased in such fashion that it is normally blocked. If a negative pulse, however, is provided from terminal E3.1 from the signal generator AZ to identify a calling station, the resulting pulse of current through the resistor 31 to the base of transistor 29 causes the transistor to become conductive temporarily and, therefore, to apply a negative pulse at terminal 4. In such fashion a pulse of current is caused to flow through the input coil 22 of the magnetostrictive wire 19.

As already mentioned, the address for identification of a calling station is characterized, in coded fashion, by several such pulses. These pulses are provided to the different corresponding travel time links U*da*1, U*da*2, U*da*3, etc. by inputs E3.9, E3.5, E3.1 etc. Each digit of a connection number (or address of a calling station) may be identified in binary code by four such inputs, and therefore four such travel time links. Nevertheless, in order to simplify the working of the operative example, it is assumed in FIG. 3 that only one wire is provided for each digit, there being three digits in each identification.

The second alternative for application of negative pulses to terminal 4 is provided by the circulation of the corresponding pulse in the wire 19. When a pulse, after having been inserted therein through a flow of current in the coil 22, reaches the end of the wire to induce a voltage across the coil 32, the normally-conducting transistor 33 is biased off. As a result, a negative pulse is furnished at the terminal 4 to turn on the transistor 23 and therefore to provide another pulse of current at the input of the magnetostrictive wire 19.

It will be evident that a number of pulses may circulate in the travel time wire 19, dependent upon the connections then existing at the various pulse phases. That is, to each connection path there is assigned a different call phase, and the identifications in that phase will be identified by pulses circulating in appropriate travel time links such as that shown at 19. The pulses assigned to a digit of an identification or connection number circulate in a number of travel time links corresponding to the number of identification digits in the number, with the same pulse phase assigned to each of these pulses.

The synchronization arrangement or phase generator TG shown symbolically in FIG. 3 is connected to insure that the pulses of the same pulse phase continue to circulate in the various circulation devices with that identical phase. The synchronization circuit is an impulse generator supplying negative impulses, the intervals of which equal the intervals which successive pulse phases may assume in various travel time links. That is, in the illustrative example, the pulses may be spaced apart by one microsecond. With the connection of the synchronization generator to the various travel time links U*da*1, U*da*2, etc. through appropriate rectifiers such as shown at 37, it is provided that a pulse from the synchronization generator TG must be coincident with a pulse provided by a blockage of transistor 33, if the terminal 4 is to be supplied with a negative pulse.

The identifications circulating in the circulation storage devices, of course can be cancelled. For this purpose, transistor 25 in travel time link U*da*1 is normally conductive but a negative pulse may be provided thereto by way of terminal L1, thus blocking the transistor. When this occurs the pulse which at that time would otherwise be stored in the travel time magnetostrictive wire 19 is prevented from flowing through the coil 22 so that the pulse is suppressed. In like manner impulses circulating in the same travel time link at different phases, and in the other travel time links, may be cancelled.

The system may also be provided with automatic cancellation of stored pulse identifications at the same time that a new identification is being stored. In this fashion separate cancellation would not be necessary.

It will be evident that the travel time links U*da*2, U*da*3, etc. provide negative pulses to their respective terminals 6, 8 etc. in similar fashion as the link U*da*1 provides such pulses to its terminal 4. Each travel time link also has a terminal 5, 7, 9, etc. connected to the decoder D*a*. These terminals are 180° out of phase with the corresponding terminals 4, 6, 8, etc. This is provided for by a circuit shown in connection with link U*da*1 as having a resistor 38 connected between the terminal 5 and potential —U. The terminal 5 is also connected through the collector to emitter circuit of a PNP transistor 40 to positive potential, while the base of the transistor is connected through a resistor 39 to the terminal 4. Since transistor 40 is normally biased off, terminal 5 is normally negative. However, when transistor 40 becomes conductive, the resulting drop across resistor 38 causes the terminal to become positive. The circuit is so connected that a negative pulse applied to the terminal 4 automatically insures conduction of the transistor 40, so that the transistor operates as an inverter.

The connections to the terminals 7 and 9, etc. are provided with corresponding inverter circuits, so that they are at opposite potentials from the respective terminals 6, 8 etc.

It will be seen that the switch *Sp*1 is connected between the synchronization or phase pulse generator TG and the input terminal 10 of the decoder D*a*. The switch *Sp*1 is controlled by the control circulation storage device U*da*, through negative pulses provided by that device.

The switch S*p*1 is provided with rectifiers 42–45 and a transmitter coil circuit U1. In the circuit as shown it will be evident that the switch S*p*1 normally blocks negative pulses from the synchronization generator TG from reaching the terminal 10 of the decoder. That is, the rectifiers are poled in such fashion that such pulses cannot reach the terminal 10. However, the switch S*p*1 is turned on by pulses provided from control store U*da* over terminal 41. These pulses are connected to the primary winding III of the transmitter and produce pulses in the secondary windings in such sense as to bias the rectifiers to permit negative pulses from the generator TG to reach the terminal 10.

The control store U*da* is identical to the travel time link U*da*1 and need not be further described. The speaking switches SN1, SN*x*, etc., may also be identical to the switch S*p*1, so that these circuits need not be further described.

The switches S*p*1, S*p*2, S*p*3 etc. are controlled by pulses emitted by the control travel time links or stores U*da*, U*db*, U*dp*, etc. In these links or storage devices, pulses circulate at a pulse phase assigned to the connection path as long as a normal call condition exists. However, if a change in call condition occurs, cancellation of the pulse circulating in the corresponding control storage device may occur. For instance, if one of the speaking stations participating in a call connection desires to make a reconfirmation call, he will effect a change in loop condition and dial a digit identifying that reconfirmation connection. A corresponding signal in the pulse phase assigned to the connection path is then conveyed to the central control apparatus through a signal multiplex line, for example SMLA. The control apparatus may then furnish a command pulse to cancel the pulse circulating in a control storage device such as U*da*. In such case of course the corresponding switch S*p*1 will be prevented from operating and the speaking switch controlled by decoder D*a* will then be prevented from being operated at that pulse phase.

The manner of operation of a decoder such as D*a* is shown in FIG. 3. In that figure, seven output terminals are provided for the decoder D*a*, namely those numbered 1D to 7D. These terminals provide for control of seven different switches of the type shown at SN1, SN*x*, etc. In addition, the decoder is furnished with input terminal pairs 4 and 5, 6 and 7, 8 and 9, etc. The identifications of the speaking stations are provided to the decoder in the form of binary-coded signals at these entrance terminal pairs. For simplification it will be assumed that only three signal elements are provided. Each signal element therefore will control one of the three terminal pairs shown.

A signal element is identified either through the presence of ground potential on one of the terminals of the terminal pair and negative potential at the other terminal, or the reverse thereof. In the "rest position," ground potential is provided at input terminals four, six and eight, and negative potential at input terminals five, seven and nine. Depending on the binary-coded signal conveyed to the input terminal pairs, one of the output terminals 1D to 7D is marked by the negative potential —U.

The elements of the decoder D*a* form a matrix provided with appropriate rectifiers. To the column or vertical lines of this matrix potential —U is connected through terminal 10 by way of resistors 11 to 17, but only during the times switch S*p*1 is closed. The line or horizontal wires of the matrix are joined in pairs and connected to respective input terminal pairs 4, and 5 etc. The rectifier bridges connect the column and line wires and are distributed and poled so that at least the potentials provided at one input terminal pair are interchanged with reference to the potentials in "rest" position, if a negative potential is to appear at one of the terminals 1D–7D. That is, when code signals are provided at the input terminals, the potentials normally present on at least one input terminal pair are interchanged and, as a result, negative potential appears at the appropriate one of the terminals 1D–7D.

As an illustration, if the potentials are interchanged only at terminal pair 4 and 5, ground potential can no longer be placed on terminal 1D through rectifier 18. Instead, negative potential —U is connected to that terminal through resistor 11. The ground potential however remains at terminals 2D to 7D, by reason of the ground potentials at terminals 5, 6 and 8.

The negative potential appearing in any case at any one of the terminals 1D to 7D is provided to turn the corresponding speaking switch on, to connect the appropriate speaking station, etc., to the multiplex path SM.

With the elements of the respective apparatus parts of FIG. 3 explained, we will turn to a description of the operation of the system when a connection exists between a speaking station N1 and an exchange office transmission device AU*ex*, with an assigned pulse phase P1. Accordingly, the identification of the speaking station N1, it being the call*ing* station, is stored in circulation storage device U*a*, and the identification of the exchange office transmission device AU*ex* is stored in storage device U*b*.

If now the speaking station N1 operates a digit key, such as the eleventh key, the loop condition of this speaking station is changed and determined in the pulse phase assigned to the existing connection. A free digit receiver ZE*x* is requested. The identification emitted is then picked up in the digit receiving device Z*i* by way of digit receiver ZE*x*. The checking apparatus ZZ then ascertains in an appropriate fashion that the identification received is a reconfirmation identification (eleventh digit). The checking means ZZ therefore provides an identification impulse to the control apparatus S*t*E over conductor *zz*.

Control apparatus S*t*E, through pulses appearing simultaneously with the reconfirmation identification signal, ascertains that the call condition exists, since pulses with this phase are simultaneously picked up in circulation storage devices U*a* and U*b*. At the same time, a signal is conveyed to the central storage apparatus over the signal multiplex line SMLA by reason of the change in the party circuit T1 indicating the reconfirmation request. This signal is at phase P1 and identifies that the speaking station N1 has provided a loop interruption, by the sensing of a digit during an existing connection. The control apparatus S*t*E, through operation upon the above identification, evaluates the signals presented to it with the phase P1 through operation of different lattice circuits, or logical OR and AND circuits, as well as through flip-flop circuits. As a result, appropriate command pulses are formed.

In an illustrative embodiment the signal given by the operation of the eleventh key remains only for a short period, such as for example 40 milliseconds. That is, the reconfirmation signal is shorter than the cycle of the signal generator AZ, which may be 100 milliseconds long. If a long signal is provided, the recognition of the condition can occur with the appropriate call phase upon the presence of the identification of the connection station in question at the output of the signal generator. In the case of signals which are shorter than the signal generator cycle, the recognition of the signals must take place independently of the signal generator cycle. This operation is possible, with the apparatus described above, through use of the circulation storage device and the decoder in a phase of the phase cycle. The signals provided over the separate signal multiplex lines for calling and called speaking stations uniquely identify the speaking station which has emitted the new identification during the existing connection.

Through the receipt of the signal emitted with the assigned call phase P1 over signal multiplex line SMLA, it is ascertained that a reconfirmation identification has been provided by speaking station N1. By reason of this determination, among other things, a pulse is conveyed to the auxiliary storage device RA over conductor *ra*. This pulse circulates in the auxiliary storage device RA with the phase P1. Now through the signals given over the conductors *ra* and *va*, indicating a coincidence with the identification of the original calling station, the identification of that station by signal generator AZ, and a reconfirmation request by the same station, an impulse circulating in the control storage device U*da* is cancelled by a command pulse from the central control apparatus S*t*E. In an appropriate case a cancellation pulse can also be conveyed to the control storage device U*db* for the cancellation of the pulse circulating in this storage device at phase P1. Thus, by reason of the determination of the fact of emission of a reconfirmation signal by speaking station N1, and through cancellation of the pulses recirculating with phase P1 in the control stores U*da* and U*db*, operation of the switches S*p*1 and S*p*2 is prevented. This of course results in prevention of operation of the speaking switches SN1 and S*x* at phase P1.

The central control apparatus can then assign to the speaking station N1 a new pulse phase, such as P2, with which that speaking station can build up a new connection. The new connection of course can be the reconfirmation connection requested and is built up through appropriate dial signals identifying the station with which the reconfirmation connection is to be made. The reconfirmation connection may be with such as the speaking station N*x*, and is accomplished in the usual fashion through operation upon coded dial signals.

If the party of speaking station N1 should once more provide the special signal (such as by operation of the eleventh digit key), during the reconfirmation connection with station N*x*, the checking apparatus ZZ would again ascertain this identification. Thus, identifications would be present over conductors *va*, *zz*, and signal multiplex line SMLA, so that the central control apparatus effects the renewed registration of a pulse in circulation storage device U*da*, and, in an appropriate case in circulation storage device U*db*. The renewed pulse has the phase P1, through the identifications furnished to the control apparatus S*t*E were with phase P2. Simultaneously, the pulse circulating in storage device U*da* with phase P2 is cancelled. As a result, the original connection between the speaking station N1 and the exchange office transmission device AU*ex* is effected once more, since a pulse having the phase P1 is circulating in each of storage devices U*a* and U*b*, because the identifications of the station N1 and the exchange office transmission device AU*e*1 were cancelled therein.

The various control commands provided by appropriate well-known logic circuits in the control apparatus at this time also effect the release of the phase, such as P2, assigned to the reconfirmation call and the cancellation or identification of the reconfirming speaking station N1 and of the reconfirmed speaking station such as N*x* in the circulation storage device U*b*.

It is evident from the above that the signal on multiplex line SMLA uniquely identifies that speaking station N1 has given the reconfirmation identification which itself is signalled by the checking arrangement ZZ. However, if a reconfirmation identification is given by the call*ed* speaking station participating in the same connection, such as for example by speaking station N*x* called over the exchange office line, then the signal multiplex line SMLB uniquely identifies that fact. Accordingly, a new pulse phase is assigned to the called speaking station for the formation of a reconfirmation connection, and switches S*p*1 and/or S*p*2 are no longer activated with the pulse phase P1, by reason of cancellation of the pulses of that phase circulating in the control storage devices U*da* and U*db*. The result is that the speaking stations of the original connection are no longer switched through to the speaking multiplex line. The production of the reconfirmation connection and the retracing of the original connection take place in similar fashion to that already described.

In each case the circulation storage apparatus RA or RB stores the identification of the reconfirmation and thus makes it possible to accomplish the retracing of the original connection in simple fashion by means merely of renewed activation of the reconfirmation key by the reconfirming speaking station. When the original connections are made again, impulses are once more registered with the original phase (such as P1) in the circulation storage devices U*da* and U*db*. Through operation of these devices the switches S*p*1 and S*p*2 again control the speaking stations SN1 and SA*x* with the pulse P1.

The signal multiplex lines SMLA and SMLB not only uniquely identify the reconfirmation signs given by the calling or called speaking station, but also identify the unique nature of any other special identification given by these stations for the initiation of special connections. Upon activation of the reconfirmation key during the reconfirmation connection, by the reconfirmed speaking station, the cancellation of the original connection by the reconfirming speaking station can initiate over signal multiplex line SMLA. The reconfirming speaking station is for example identified in rotation storage device U*a* with phase P2. Upon activation of the reconfirmation key by the reconfirmed speaking station during the reconfirmation connection, the shift of the speaking station not participating in the reconfirmation connection is initiated over signal multiplex line SMLB. This therefore occurs through emission of corresponding signals to the central control apparatus.

In each case switches S*p*1 and S*p*2 are controlled by circulation storage devices U*da* or U*db* and in these devices pulses are registered or cancelled by commands from the central storage apparatus generated in dependence upon the identifications present at the particular pulse phase involved and provided at the appropriate inputs of the control apparatus. In this manner certain switching conditions can control the switching on and switching off of speaking stations at the signal multiplex line.

In the above described apparatus, reconfirmation is also possible without special difficulty during an existing connection between two speaking stations of a secondary installation. Furthermore, in each case, the simultaneous reconfirmation initiation through two connection stations participating in a connection can be prevented by suitable command emissions from the control apparatus S*t*E.

In accordance with the above described processes for the first reconfirmation, the speaking station participating in an existing connection can initiate any second and further reconfirmation. In addition, a repeated shift, such as of an exchange office connection is possible.

Reference may be made to co-pending application Ser. No. 390,143, filed Aug. 17, 1964, in the names of Alan Darre, Otto Kneisel and Horst Honold, for an illustrative disclosure of parts of the control apparatus S*t*E capable of accomplishing reconfirmation and shifting connections of the type above shown.

In the above description there was described a reconfirmation connection in which a new pulse phase was assigned for the reconfirmation call. In this connection, FIG. 2 shows the circulation storage device U*a* as provided for the calling stations, including the exchange office transmission devices, and the circulation storage device U*b* for the called connection stations, including exchange office transmission devices. However, as disclosed in our co-pending application Ser. No. 390,027, filed Aug. 17, 1964, the exchange office transmission device may be provided with a special circulation storage device. In this case no special phase would be required for the reconfirmation connections of exchange office calls to speaking stations of secondary installations.

In apparatus provided with special circulation storage devices for exchange office transmission circuits, in the case of reconfirmation calls with an exchange office connection operating as the called station, then the identification of the calling speaking station, such as N1, is registered in circulation storage device U*a*, and the identification of the exchange office transmission device, such as AU*ex* is stored in the special circulation storage device, both with an assigned free pulse phase, such as for example P1. In the case of an exchange office call originated by the exchange office, the identification of the exchange office transmission device will be registered in the special circulation storage device and the identification of the called connection station (such as N1) will be registered in the storage device U*b* provided for called connection stations. In the different cases, by activation of a reconfirmation key by the speaking station N1, by evaluation of corresponding identifications in the central control apparatus, either circulation storage device U*b* for connection stations to be called or circulation storage device U*a* for calling connection stations is seized, since that storage device is not used in the original connection. The production of the reconfirmation connection accordingly also takes place with phase P1, with the reconfirmed speaking station identified in the newly-seized storage device U*a* or U*b*.

Since the exchange office party is not permitted to participate in the reconfirmation connection to be made, a switch similar to switches S*p*1, S*p*2 will be assigned to the decoder of the circulation storage device assigned to exchange office transmission devices. This circuit will also be provided with a control circulation storage device similar to the devices U*da* and U*db*. The switch is not permitted to be operated in reconfirmation connections, so the corresponding pulse is to be cancelled in the control circulation storage device in the same fashion as above described in connection with the control of switches S*p*1 and S*p*2 by control storage devices U*da* and U*db*.

In addition, an operator who has made a connection over circulation storage device U*p* and decoder D*p* with a speaking station such as N1 (identified in store U*a*) may have to make a reconfirmation or inquiry of a station to be called, at some time during the exchange process. In this case the operator can seize the circulation storage device U*b* by emission of a special signal for the production of the inquiry connection. The production of this connection then takes place in the manner already described. However, through the control apparatus S*t*E, phase P1 which was assigned for the connection to the speaking station N1 (and is also to be used for the inquiry connection), is cancelled in the circulation storage device U*da* in order that the switch S*p*1 will no longer be operated with phase P1. As a result, the party of speaking station N1 is not switched to the speaking multiplex point with the phase P1. Thus, through this control of the switch S*p*1, the party of speaking station N1 is prevented from listening in to the reconfirmation connection.

It will be evident that many minor changes could be made in the apparatus specifically described herein as illustrative of the invention. Accordingly, the invention is not to be considered limited to the apparatus specifically described but rather only by the scope of the appended claims.

We claim:

1. In a telephone exchange system operating in accordance with the time multiplex principle to transmit information over a multiplex path and including a first and a second circulation storage device each operable periodically to provide at its output a coded identification of a different one of the calling and the called stations of an existing connection, a speaking switch connected between each station and the multiplex path and operable when closed to connect its station to that path, a different decoder connected to each said storage device and to said speaking switches, said decoders each being operable to translate the coded identification provided from their respective storage devices into operation of the speaking switch assigned to the identified station, the identifications of the calling and called stations being stored in the respective storage devices in the same cyclic pulse phase, at least one of said calling and called stations being operable to emit a special signal signifying a desired change in connection, the improvement comprising a different control circulating storage device associated with each of said decoders, each operable to provide at its output periodically during the connection a pulse of the same pulse phase, said control devices being operable to permit operation of the associated decoder only when said pulses are available at their outputs, and cancellation means responsive to emission of said special signal from one of said stations and operative to cancel the said pulse in the control device associated with the other station to prevent that other station from being connected to the multiplex path in the said pulse phase.

2. The apparatus of claim 1 in which said cancellation means is also operative to cancel the said pulse in the control device associated with said one station, upon emission of said special signal from that station, to prevent said one station from being connected to the multiplex path in said pulse phase.

3. The apparatus of claim 2 including identification means for supplying a coded identification of the station emitting said special signal in form suitable for storage in one of said circulation storage devices, and switch means responsive to emission of said special signal for connecting said identification means to said one storage means in a pulse phase different from the phase assigned to said existing connection.

4. The apparatus of claim 3 including receiver means connected to the station emitting said special signal and operable to translate dialing signals therefrom into a coded identification of a station to be called in a new connection, switch means responsive to a determination that such called station is not busy to connect said receiver means to the other storage means in said different pulse phase, and means for supplying said different pulse phase to each of said control devices for storage and repetitive cyclic supply thereof, so that the calling and called stations of the new connection may each be connected to said multiplex path cyclically in said different pulse phase.

5. The apparatus of claim 4 in which said cancellation means is further operative upon emission of a further special signal by the calling station of said new connection, to cancel the pulses of said different pulse phase in each of said control devices, and means responsive to said emission of said further special signal to supply pulses of said first-mentioned phase to each of said control devices to provide for re-establishment of said existing connection.

6. The apparatus of claim 4 including means responsive to emission of a shift signal by the called station of said new connection for storing the identification of said other station which was connected in said existing connection in its respective storage device in said different pulse phase, so that said other station and said called station may be connected to said multiplex path in said different phase.

References Cited

UNITED STATES PATENTS

| | | | |
|---|---|---|---|
| 2,766,327 | 10/1956 | Lesti | 179—18.9 |
| 2,984,705 | 5/1961 | Harris | 179—15 |
| 3,271,521 | 9/1966 | Von Sanden et al. | 179—15 |
| 3,296,377 | 1/1967 | Von Sanden et al. | 179—15 |

KATHLEEN H. CLAFFY, *Primary Examiner.*

L. A. WRIGHT, *Assistant Examiner.*